United States Patent [19]

Wang et al.

[11] Patent Number: 5,912,296
[45] Date of Patent: Jun. 15, 1999

[54] EXTENDED POLYMER COMPOSITION DERIVED FROM GRAFTED ELASTOMERS AND POLYPROPYLENE

[75] Inventors: Xiaorong Wang, Akron; Frank J. Clark, Massillon; Hideo Takeichi, Akron, all of Ohio; Takahiro Matsuse, Kodaira, Japan; Naruhiko Mashita, Kodaira, Japan; Shinichi Toyosawa, Tokorozawa, Japan

[73] Assignee: Bridgestone Corporation, Tokyo, Japan

[21] Appl. No.: 08/858,678

[22] Filed: May 19, 1997

[51] Int. Cl.$^6$ ................ C08J 3/21; C08L 51/00
[52] U.S. Cl. ............ 524/534; 525/242; 525/267; 525/193; 525/194; 525/327.6
[58] Field of Search .............. 525/242, 267, 525/193, 194, 327.6; 524/474, 534, 484, 81, 262

[56] References Cited

U.S. PATENT DOCUMENTS

| | | |
|---|---|---|
| 3,414,551 | 12/1968 | Reid et al. . |
| 3,480,580 | 11/1969 | Joyner et al. . |
| 3,481,910 | 12/1969 | Brunson . |
| 3,492,227 | 1/1970 | Kolalan . |
| 3,577,365 | 5/1971 | Folzenlogen . |
| 3,761,458 | 9/1973 | Holler et al. . |
| 3,796,687 | 3/1974 | Collette et al. . |
| 3,862,265 | 1/1975 | Steinkamp et al. . |
| 4,017,669 | 4/1977 | Collette et al. . |
| 4,087,485 | 5/1978 | Huff . |
| 4,139,417 | 2/1979 | Marie et al. . |
| 4,423,196 | 12/1983 | Arit et al. . |
| 4,427,828 | 1/1984 | Hergenrother et al. . |
| 4,506,056 | 3/1985 | Gaylord . |
| 4,540,753 | 9/1985 | Cozewith et al. . |
| 5,244,971 | 9/1993 | Jean-Marc . |
| 5,414,044 | 5/1995 | Moriya et al. ............ 525/74 |
| 5,637,410 | 6/1997 | Bonner et al. ............ 428/16 |
| 5,665,820 | 9/1997 | Leistner et al. ............ 525/67 |
| 5,783,630 | 7/1998 | Evans et al. ............ 524/47 |

FOREIGN PATENT DOCUMENTS

| | | |
|---|---|---|
| 440922 | 8/1991 | European Pat. Off. . |
| 0563956 A2 | 10/1993 | European Pat. Off. . |

OTHER PUBLICATIONS

WPIDS AN 94–189093, Abstracting JP–06128432 A, May 1994.

*Primary Examiner*—Jeffrey C. Mullis
*Attorney, Agent, or Firm*—D. A. Thomas

[57] ABSTRACT

There are disclosed a gel or polymer composition which comprises 100 parts by weight of: a graft copolymer composition formed from the graft reaction of a maleate functionalized ethylene-alpha-olefin copolymer and a maleate functionalized polypropylene with an organic diamine grafting agent, and at least 30 parts by weight of an extender oil or a low molecular weight organic component. These gel compositions have super soft properties, heat resistance, and/or damping properties.

19 Claims, No Drawings

EXTENDED POLYMER COMPOSITION DERIVED FROM GRAFTED ELASTOMERS AND POLYPROPYLENE

BACKGROUND OF THE INVENTION

The usefulness of ethylene-propylene rubber ("EPR"), the general term for ethylene-alpha-olefin copolymer ("EPC")/ethylene-alpha-olefin-diene monomer ("EPDM") elastomeric polymers, for improving the impact strength of polypropylene ("PP") plastic compositions is known. The improvement may be generally accomplished through producing a simple physical mixture of PP with EPR.

For example, U.S. Pat. No. 4,087,485, to Huff, is directed to improving the impact strength of a polypropylene composition by incorporating therein minor amounts of polyethylene and ethylene-propylene copolymer.

It is recognized that two or more polymers may be blended together to form a wide variety of random or structured morphologies to obtain products that potentially offer desirable combinations of characteristics. However, it may be difficult or impossible in practice to achieve many potential combinations through simple blending because of some inherent and fundamental problems. Frequently, the two polymers are thermodynamically immiscible, which precludes generating a truly homogeneous product. This immiscibility may not be a problem per se since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is extremely desirable to prepare a graft copolymer having the impact strength of polypropylene and the elastomeric properties of EPR and to extend the resultant copolymer with a high oil or low molecular weight component content to obtain a soft material having a low Shore A hardness.

Thus, the oil or low molecular weight component extended graft polymers of this invention, comprising a maleated EPR grafted to a maleated polypropylene by the use of a difunctional grafting agent reactive with the maleate groups on the EPR and the polypropylene, are believed to be unknown prior to the disclosure herein.

OBJECTS OF THE INVENTION

Accordingly, it is an object of this invention to provide an oil or low molecular weight component extended graft copolymer of a maleated polypropylene and a maleated ethylene-alpha-olefin and/or maleated ethylene-alpha-olefin-diene elastomer that is useful in producing high damping, super soft materials.

More specifically, it is an object of this invention to provide a graft copolymer formed by reacting maleated polypropylene and maleated EPR with a diamine.

Another object of the invention is to provide oil or low molecular weight component extended graft copolymers that exhibit improved properties, including low Shore A hardness less than 30, high damping properties and a service temperature of about 100° C.

SUMMARY OF THE INVENTION

The object of the present invention under such circumstances is to provide an oil or low molecular weight component extended grafted EPR (ethylene-alpha-olefin and/or ethylene-alpha-olefin-diene based elastomer)-polypropylene copolymer soft gel composition having damping properties useful in producing molded products having heat resistance and a high elasticity and damping property such as industrial materials, electric and electronic materials, industrial construction materials, car parts, sporting goods, shoes, domestic electrical appliances and various mechanical parts.

The present invention is broadly directed to graft copolymer compositions comprising a maleated polypropylene and a maleated EPR reacted with a diamine. It is further directed to a process for preparing an oil extended graft copolymer compositions broadly comprising a maleated polypropylene grafted to a functionalized thermoplastic elastomer, namely maleated EPR, under conditions sufficient to permit grafting of the functionalized polypropylene with the functionalized thermoplastic elastomer.

DETAILED DESCRIPTION OF THE INVENTION

The extended graft polymer gels of the present invention contain: 100 parts by weight of a graft polymer of a maleated EPR (ethylene-alpha-olefin and/or ethylene-alpha-olefin-diene based elastomer) having one or more maleated polypropylene segments grafted thereto through the one or more functional linkages formed by a cross linking reaction with a diamine grafting agent; and at least 30, preferably 30 to 1000, parts by weight of an extender such as an oil or a low molecular weight component.

The graft copolymer composition of this invention is a maleated EPR (ethylene-alpha-olefin and/or ethylene-alpha-olefin-diene based elastomer) described hereinafter subsequently graft-reacted through a difunctional linking or grafting agent to a maleated polypropylene to yield a maleated EPR having one or more polypropylene segments grafted thereto through the one or more functional linkages thus formed. "EPR" is herein defined as any ethylene-alpha-olefin and/or ethylene-alpha-olefin-diene based elastomers. The maleated polypropylene may be any of the conventionally known polypropylene compounds that are subsequently maleated by methods known in the art.

Maleated Polypropylene

The polypropylene graft segment or segments will have molecular weights of about 10,000 up to about 10,000,000, or higher, preferably about 20,000 to about 300,000 M(w). The crystallinity, or tacticity, of the polypropylene may vary from being substantially amorphous to being completely crystalline, that is from about 10–100% crystallinity. Most typically, because of the extensive commercial use of isotactic polypropylene, the graft polypropylene will be substantially crystalline, e.g., greater than about 90%. Generally, the polypropylene is substantially free of ethylene. However, under certain circumstances small amounts of ethylene, on the order of less than about 5% by weight, may be incorporated. Furthermore, in certain instances the polypropylene contain small amounts of ethylene in copolymers known as "reactor copolymers". Thus, it is within the scope of the invention that the graft polypropylene contain minor amounts of ethylene, both as part of ethylene-propylene segments and as polyethylene segments.

Polymerization conditions for the preparation of polypropylene are well known in the art. Propylene can be polymerized into isotactic polypropylene in the presence of stereo-specific Ziegler-Natta catalyst systems comprising compounds of the transition metals of Groups 4 to 6 and 8 of the Periodic Table of elements, preferably titanium compounds, most preferably titanium halides, and organo-metalic compounds of elements of groups 1 to 3 of the Periodic Table, especially aluminum alkyls or aluminum alkyl halides. Illustrative examples include titanium trichloride, titanium tetrachloride as catalysts and triethyla-luminum and diethyl aluminum chloride as cocatalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors.

Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C. and is preferably at a range or about 60° C. to about 80° C. Polymerization pressure can also vary over a wide range and is not particularly limited. The polymerization pressure can for example be in the range from between atmospheric pressure to 37,000 KPa. Such procedures and components are only illustrative of the knowledge in the art with respect to polypropylene polymerization, any are contemplated as useful within the scope of the invention. For general review of literature and patents in the art see "Olefin Polymers (Polypropylene)" in the Kirk-Othmer Encyclopedia of Chemical Technology, 3rd Edition v. 16, 453–469 (J. Wiley & Sons, 1981).

The maleinization of the polypropylene compound to maleated polypropylene is conveniently accomplished by heating a blend of polypropylene and ethylenically unsaturated carboxyl group-containing compounds, e.g., maleic anhydride, within a range of about 150° to 400° C., often in the presence of free-radical initiators such as organic peroxides that are well-known in the art. Free-radical grafting of the carboxyl group-containing compounds onto the polypropylene readily results. Methods of preparing these graft polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. Such processes are well-known in the art, for example, an independent source of the description of the process is found in Y. Minoura, M. Ueda, S. Mizinuma and M. Oba, J. Applied Polymer Sci. 1625 (1969). The use of heat and/or physical shearing optionally with the free-radical initiators, in such equipment as extruders, masticators, and the like, to simultaneously accomplish controlled degradation in molecular weight of the polypropylene along with the free-radical grafting of the maleic anhydride, all as known in the art, will be useful in accordance with this invention.

In particular, it is preferable to conduct the maleinization with such amounts of maleic anhydride and free-radical initiators, and under conditions of temperature and shearing such that free-radical sites on the polypropylene are formed substantially at the time of scission of the polypropylene chains and are formed at the point of such scission. The maleic anhydride is then grafted onto the scissioned end of one side of such broken chains. In this manner the anhydride groups are located principally at the ends of the maleated polypropylene chains, and the substantial majority of such maleated polypropylene chains contain one site of maleinization. This procedure permits grafting of the maleated polypropylene at its maleated end to the maleated EPR though the use of a difunctional linking or grafting agents having a two functional groups each functional group being reactive with a maleate group on the polypropylene and EPR. Multiple sites of maleinization can lead to grafting of the maleated polypropylene to more than one maleated EPR polymer chain or at more than one site of one or more maleated EPR polymer.

In accordance with the above, the free-radical initiator is preferably used and will typically be utilized in an amount of from about 0.01 to 1.0 wt. %, preferably from about 0.02 to 0.5 wt. %, and most preferably from about 0.04 to 0.3 wt. % of the total polypropylene, and solvent if used, and will be added first. The mixture is then heated to a temperature at or about the known decomposition temperature of the selected free-radical initiator, concurrently with any optional mechanical shearing. The maleic anhydride is subsequently added in an amount typically from about 0.01 to 10.0 wt. %, preferably from about 0.02 to 5 wt. %, and most preferably about 0.1 to 2 wt. % of the total polypropylene.

The maleated polypropylene of this invention will contain from about 0.02 wt. % incorporated maleic anhydride, based upon the weight of the maleated polypropylene, and can range up to about 5 wt. %. Preferably the maleic anhydride content will be from about 0.01 to about 2 wt. %, most preferably about 0.03 to about 1.0 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental affects on the subsequent reaction of the maleated EPR with the maleated polypropylene.

Preparation of the Maleated EPR

The maleated EPR of this invention can be prepared by either copolymerization of the constituent monomers or by the grafting of a maleate function onto an ethylene-alpha-olefin copolymer backbone, which is meant to include any of the conventionally known ethylene-alpha-olefin and/or ethylene-alpha-olefin-diene monomer elastomeric polymers. Thus the maleated functionalized ethylene-alpha-olefin copolymer (and/or maleated functionalized ethylene-alpha-olefin-diene copolymer) segment or segments of this invention (hereinafter referred to as "maleated EPR") is meant to include terpolymers, tetrapolymers, etc. It will comprise ethylene, one or more alpha-olefins, and optionally, one or more diene monomers; it will have one or more functional sites thereon provided by one or more maleate functional-group containing monomers; it will be substantially amorphous; and it will have a substantially random arrangement of at least the ethylene and the alpha-olefin monomers.

The maleated EPR, prior to grafting with maleated polypropylene, will generally have a molecular weight range between about 5,000 and up to about 1,000,000 or higher, more typically between about 10,000 and 500,000, and even more typically between about 15,000 and 350,000, where the molecular weight is weight-average ("$M_w$").

Typically EPR is "substantially amorphous", and when that term is used to define the maleated EPR, it is to be taken to mean having a degree of crystallinity less than about 25% as measured by means known in the art, preferably less than about 15%, and more preferably less than about 10%. The three major known methods of determining crystallinity are based on specific volume, x-ray diffraction, and infrared spectroscopy. Another well-established method, based on measurement of heat content as a function of temperature through the fusion range, is now easily carried out using differential scanning calorimetric measurements. It is known that these independent techniques lead to good experimental agreement. The degree of randomness of the arrangement of monomers in the maleated EPR, also affects the crystallinity and is appropriately characterized by the degree of crystallinity.

Additionally, it is known in the art that the tendency of a particular combination of catalyst system and monomers to produce blocky, random, or alternating polymers can be characterized by the product of the reactivity ratios defined for the given monomers under the specific reaction conditions encountered. If this product is equal to 1.0, the sequence distribution will be perfectly random; the more the product is less than 1.0, the more the monomers will approach alternating sequence; and, the more the product is greater than 1.0, the more the monomers will tend to have a "blocky" sequence distribution. Generally speaking, the segments of a polymer which crystallize are linear segments which have a number of identical units (both by chemical make-up and stereo-specific orientation)in a row. Such segments are said to be "blocky". If there is little or no such sequential order within the segments making up a polymer chain, that chain will be very unlikely to conform itself into the correct shape to fit into the spatial order of a crystal and will accordingly exhibit a low degree of crystallinity. The maleated EPR portion of the graft polymer of this invention accordingly is characterized by the limitation that its method for preparation has a reactivity ratio product less than 2.0, preferably less than about 1.5, and more preferably less than about 1.25.

The maleated EPR will contain about 20 to about 90 weight percent ethylene, preferably about 30 to 85 weight percent ethylene, and even more preferably about 35 to about 80 weight percent ethylene.

Alpha-olefins suitable for use in the preparation of the EPR or maleated EPR are preferably $C_3$–$C_{16}$ alpha-olefins. Illustrative non-limiting examples of such alpha-olefins are one or more of propylene, 1-butene, 1-pentene, 1-hexene, 1-octene, and 1-dodecene. The alpha-olefin content of the EPR is generally about 10 to about 80 weight percent, preferably about 20 to about 70 weight percent. As indicated above the choice of alpha-olefin, or alpha-olefins if a mix is used, preferably will follow that of the alpha-olefin(s) in the EPR though a selection that differs within the examples given above will still be useful to some extent for the purposes of this invention.

The diene monomers useful in this invention include those typically used in known EPDM polymers. The typically used diene monomers are generally selected from the easily polymerizable non-conjugated dienes and can be straight chain, hydrocarbon di-olefins or cycloalkenyl-substituted alkenes, having about 6 to about 15 carbon atoms, for example:

A. straight chain acyclic dienes such as 1,4-hexadiene and 1,6-octadiene.
B. branched chain acyclic dienes such as 5-methyl-1,4-hexadiene; 3,7-dimethyl-1,6-octadiene; 3,7-dimethyl-1,7-octadiene and the mixed isomers of dihydro-myricene and dihydro-ocinene;
C. single ring alicyclic dienes such as 1,3-cyclopentadiene; 1,4-cyclohexadiene; 1,5-cyclo-octadiene and 1,5-cyclododecadiene;
D. multi-ring alicyclic fused and bridged ring dienes such as tetrahydroindene, methyl, tetrahydroindene, dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene, 5-isopropylidene-2-norbornene, 5-(4-cyclopentenyl)-2-norbornene, 5-cyclohexylidene-2-norbornene, 5-vinyl-2-norbornene; and
E. cycloalkenyl-substituted alkenes, such as allyl cyclohexene, vinyl cyclooctene, allyl cyclodecene, vinyl cyclododecene.

Of these, the preferred dienes are dicyclopentadiene, 1,4-hexadiene, 5-methylene-2-norbornene, and 5-ethylidene-2-norbornene. Particularly preferred dienes are 5-ethylidene-2-norbornene and 1,4-hexadiene. It will be apparent that a mix of such dienes can also be utilized. The content of the optional diene monomer in the maleated EPR can be 0 to about 15 weight percent, and if used, preferably 0.5 to about 12 weight percent, and most preferably about 1.0 to about 6.0 weight percent.

Descriptions for Ziegler copolymerization of functional polymers are to be found, inter alia, in U.S. Pat. Nos. 3,492,227, 3,761,458, 3,796,687, 4,017,669, 4,139,417 and 4,423,196, the disclosures of which, including compounds and processes, are incorporated by reference. These patents teach the preparation of elastomeric ethylene random terpolymers, tetrapolymers, etc., from alpha-olefins, non-conjugated dienes and unsaturated polar functional monomers by direct Ziegler-Natta polymerization of the monomers, usually in solvent, utilizing catalyst systems composed of trivalent, and higher, vanadium compounds, organoaluminum compounds and halogenated reactivator compounds. These polymerization reactions are run in the absence of moisture in an inert atmosphere and in a preferred temperature range of 0° to 65° C. Both continuous and batch reactions are taught.

These ethylene terpolymers, tetrapolymers, etc., are readily prepared using soluble Ziegler-Natta catalyst compositions. Such non-stereospecific Ziegler-Natta catalyst systems useful in accordance with this invention for producing random ethylene alpha-olefin copolymers include the organic and inorganic components of the transition metals of Group 4A to 8A of the Mendeleyev Periodic Table of the Elements. Particularly useful are the halides, oxyhalides, esters, acetyl acetonates, etc., of the metals vanadium, zirconium and hafnium. As is well known in the art, these are utilized with cocatalyst organo-aluminum compounds, organoaluminum halides, mixtures, etc. The systems may be utilized in solvent, slurry or gas-phase processes and may be supported on inert supports, such as silicon dioxide, silica gel, or metal oxides or chlorides of zinc, magnesium, etc. Also as known, pre- polymers may be formed as supports for these catalyst systems. Catalyst activators or promoters, molecular weight regulators, Lewis-base electron donors all may be utilized as disclosed in the art.

More particularly, in carrying out the process of this invention, the preferred non-stereospecific Ziegler-Natta catalyst systems are those that exhibit a differential polymerization activity with the monomers used such that the rate of conversion of ethylene and the diene monomers are approximately equal yet greater than the rate of conversion of propylene, which is equal to or greater than the rate of conversion of other selected alpha-olefins. Rates of conversion are measured, as known in the art, by, for example, feeding known weight percent amounts of the selected monomers in solvent into a standard continuous-flow stirred tank reactor along with the catalyst/co-catalyst system, and analyzing the weight percent monomer content (again in solvent) of the resulting polymer product. The rate of conversion is the weight percent of the monomer in the polymer product to the weight percent of the monomer in the initial feed stream. Ethylene content is determined conveniently by methods described in ASTM D3900, diene monomer content is determined conveniently by refractive index methods as described in I. J. Gardner and G. VerStrate, Rubber Chem. Tech., 46, 1019 (1973). Such preferred catalyst systems are based on vanadium compounds which have a vanadium valence of at least 3, and which are soluble in the polymerization diluent; preferably the vanadium catalyst is $VX_4$ or an oxyvanadium compound of the general formula $VOX_n(OR')_{3-n}$ where n is an integer of 2 or 3, R' is a hydrocarbyl radical and X is halogen, preferably chlorine or bromine. Preferably R' is $C_1-C_{10}$ alkyl, phenyl or benzyl, more preferably R' is $C_1-C_4$ alkyl, e.g., methyl, ethyl or butyl. $VCl_4$ and $VOCl_3$ are particularly useful in this maleated EPR are the vanadium salts of beta-diketonates having the general formula of $V(O\ O)_3$ where O O represents the diketonate anion, e.g., vanadium-tris (2,4-pentanedionate).

The preferred cocatalysts utilized to prepare an appropriate active catalyst species are the alkyl aluminums and alkyl aluminum halides. A particularly preferred cocatalyst is an aluminum compound such as $Al_4R''_3X'_3$ or $AlR''_bX'_{3-b}$, wherein R" is a hydrocarbyl moiety, X' is halogen and b is 1 to 2. While the halogen can be chlorine, bromine or iodine, the preferred halogen is chlorine. The hydrocarbyl moiety can be a $C_1-C_{20}$ alkyl, cycloalkyl or aromatic group. Preferably R" is $C_1-C_{10}$ alkyl or cycloalkyl, phenyl or benzyl. Most preferably R" are methyl, ethyl, n-propyl, iso-butyl, hexyl, cyclohexyl, phenyl or mixtures thereof. In its preferred embodiment the aluminum compound is a dialkyl aluminum halide or alkyl aluminum sesquihalide. More preferably the aluminum compound is diethyl aluminum chloride ("DEAC") or ethyl aluminum sesquichloride ("EASC"). In utilizing the catalyst system of this invention the vanadium compound and aluminum compound can be utilized at a Al/V mole ratio of about 1 to about 40, preferably about 2 to about 20, more preferably about 3 to about 10, e.g., 5 to about 10.

Suitable polymers may be prepared in either batch or continuous reactor systems, in gas phase, solution or slurry polymerizations. In particular, effective use can be made of a tubular reactor system to achieve novel molecular composition and molecular weight distribution in accordance with U.S. Pat. No. 4,540,753, which is incorporated herein by reference. In common with all Ziegler-Natta polymerizations, monomers, solvents and catalyst components are dried and freed from moisture, oxygen or other constituents which are known to be harmful to the activity of the catalyst system. The feed tanks, lines and reactors may be protected by blanketing with an inert dry gas such as purified nitrogen. Chain propagation retarders or stoppers, such as hydrogen and anhydrous hydrogen chloride, may be fed continuously or intermittently, to any but the tubular reactor of U.S. Pat. No. 4,540,753, for the purpose of controlling the molecular weight and/or MWD within the desired limits.

Additionally, it is known to incorporate "branch suppressors" during EPDM polymerization to reduce branching. It is known in the art that certain Lewis bases, e.g., NH(3), are effective as branch suppressors. Additionally, certain alkoxy silanes, e.g., methyl silicate ($Si(OMe)_4$), ethyl silicate ($Si(OEt)_4$), etc., have been recently discovered to act as effective branch suppressors without reducing catalyst efficiency or reactivity. The particular amount of suppressor required to suppress branching will depend on the nature of the suppressor, the diolefin, the catalyst system, the Al/V ratio and the polymerization conditions. The use of excessive amounts of silicates will result in reduced catalyst activity. The silicate concentration can also be expressed in terms of Si/V mole ratio and can vary from about 0.1 to about 3.0. The vanadium and aluminum compounds can be added to the reactor either separately or premixed with one another. The silicates, optionally used as branching suppressors, should be added to the reactor separately and not in combination with any of the catalyst components in order to avoid reaction with the catalyst components and an alteration of their polymerization characteristics.

The term "maleic anhydride adduct" as employed herein refers to polymer products containing pendent succinic anhydride groups which are formed by reacting by heating a mixture of the maleic anhydride and the EPR copolymer. As will be discussed hereinafter, this polymer by virtue of the presence of the pendent succinic anhydride group can be reacted under appropriate conditions with the functional groups such as the amine groups of a polyamine to produce a proportion of graft copolymer.

As indicated, the maleic anhydride adduct is prepared by reacting maleic anhydride with a EPR containing residual unsaturation. The amounts of maleic anhydride employed in the reaction can vary considerably depending on the specific nature of the EPR copolymer and the properties desired in the polymer product. In general, the amount of maleic anhydride employed may range from about 0.01 to about 25 percent by weight based on total weight of maleic anhydride and EPR copolymer with a preferred amount being from 0.02 to 5 percent by weight. The maleated EPR elastomers are formed by copolymerization of EPR with compounds including ethylenically unsaturated carboxyl group-containing compounds, e.g., maleic anhydride as is well known to those skilled in the art. Other techniques for providing EPR with maleate functionality can be performed according to the procedures for providing maleate functionality onto polypropylene as discussed herein utilizing reaction conditions appropriately modified as are well known to those skilled in the art.

It should be observed that the above-described polymers and copolymers and maleated forms thereof may, if desired, be readily prepared by the methods set forth above. However, since many of these polymers and copolymers are commercially available, it is usually preferred to employ commercially available polymers in order to the reduce the number of processing steps involved in the overall process.

As indicated heretofore, the maleic anhydride adduct component of the compositions of the invention is prepared by a relatively uncomplicated process which does not require complex copolymerization or grafting procedures. Thus, the maleic anhydride adduct can be prepared by first forming a homogeneous mixture or solution of the maleic anhydride and the EPR copolymer containing residual unsaturation and then reacting the resultant mixture or solution under appropriate conditions of time and temperature. In forming the homogeneous mixture, the maleic anhydride preferably in particle form and the EPR copolymer in solid form can be mixed in any convenient mixing apparatus such as, for example, a two-roll mill or a mixing extruder. In the solution method, the maleic anhydride and the EPR copolymer can be separately dissolved in aliphatic or aromatic solvents such as toluene, hexane, heptane, xylene, chlorobenzene or the like and the solutions then combined or both components may be dissolved together in an appropriate solvent. When the solution method is employed, the solvent can be removed following the reaction by any convenient drying method such as, for example, drum drying.

The specific conditions employed in reacting the resultant mixture or solution of maleic anhydride and EPR copolymer can vary considerably depending on factors such as the specific amounts of ingredients and the nature of the EPR copolymer and its reactivity. Thus, temperatures may range from 130° to 320° C. with a preferred range being from 170° to 300° C. Times may range from 0.001 hour to 200 hours, depending on the specific temperature utilized, nature of the EPR copolymer, etc. In addition, it is preferred to conduct the reaction under an inert gas such as nitrogen.

The amounts of maleic anhydride adduct component, such as maleated EPR, included in the compositions of the invention may vary somewhat depending upon the properties desired in the finished composition. In general, the amounts of maleic anhydride adduct included in the composition may range from about 50 to about 99 percent by weight based on total weight of composition. Preferred amounts of maleic anhydride adduct are from 60 to 95 percent by weight with a particularly preferred amount being from 65 to 85 percent by weight.

Suitable EPR hydrocarbon elastomers of the instant invention are copolymers of ethylene, an alpha-olefin, and optionally a non-conjugated diene. Examples of such hydrocarbon elastomers are those marketed by Copolymer Rubber and Chemical Corporation under the tradename EPsyn and those marketed by E.I. dupont de Nemours and Company under the tradename Nordel.

As the component grafted onto the EPR rubbery copolymer, it is preferred to make use of maleic anhydride but other unsaturated dicarboxylic acid anhydrides, diacids, or mixed acid/esters may be used. For example, the maleic anhydride may be substituted in whole or in part with equal molecular equivalents of other unsaturated dicarboxylic acids or anhydrides, such as itaconic acid or anhydride, fumaric acid, maleic acid and the like.

The grafting reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumene hydroperoxide, t-butylperbenzoate or other free radical source capable of hydrogen abstraction, as represented by alkyl peroxy esters, alkyl peroxides, alkyl hydroperoxides, diacylperoxides and the like. The amount of catalyst as well as reaction conditions will vary with the choice of catalyst.

The desired results are achieved when the amount of anhydride or diacid grafted onto the EPR polymer is within the range of 0.01 to 5 percent by weight of the base polymer and preferably in an amount within the range of 0.1 to 4 percent graft. In general, the amount grafted onto the polymer will represent only 30 to 50 percent of the graft material reacted with the polymer. For example, to achieve a graft of 4 percent maleic anhydride onto a preformed EPR copolymer, a charge of about 10 percent maleic anhydride will be required.

Grafting of Maleated Polypropylene and Maleated EPR Copolymer

Grafting of maleated polypropylene and maleated EPR copolymer is performed by an additon a grafting agent such as a polyamine, preferably an organic diamine, to a blend of maleated polypropylene and maleated EPR copolymer to partially cross-link the polypropylene to the EPR through the maleate functional groups.

Suitable organic diamines or diamine mixtures containing two aliphatically or cycloaliphatically bound primary amino groups are used for the process according to the present invention. Such amines include, for example, aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms, e.g., ethylene diamine; 1,2- and 1,3- propylene diamine; 1,4-diaminobutane; 2,2-dimethylpropane diamine-(1,3); 1,6-diaminohexane; 2,5-dimethylhexane diamine-(2,5); 2,2,4-trimethylhexane diamine-(1,6); 1,8-diaminooctane; 1,10-diaminodecane; 1,11-undecane diamine; 1,12-dodecane diamine; 1-methyl-4-(aminoisopropyl)-cyclohexylamine-1; 3-aminomethyl-3,5,5-trimethyl-cyclohexylamine-(1); 1,2-bis-(aminomethyl)-cyclobutane; p-xylylene diamine; 1,2- and 1,4-diaminocyclohexane; 1,2-; 1,4-; 1,5- and 1,8-diaminodecalin; 1-methyl-4-aminoisopropyl-cyclohexylamine-1; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4- bis-(2-aminoethyl)-benzene; benzidine; 4,4'-thiodianiline, dianisidine; 2,4-toluenediamine, diaminoditolylsulfone; 2,6-diaminopyridine; 4-methoxy-6-methyl-m-phenylenediamine; diaminodiphenyl ether; 4,4'-bis(o-toluidine); o-phenylenediamine, o-phenylenediamine, methylenebis(o-chloroaniline); bis(3,4-diaminiophenyl) sulfone; diaminiodiphenylsulfone; 4-chloro-o-phenylenediamine; m-aminobenzylamine; m-phenylenediamine; 4,4'-$C_1$–$C_6$-dianiline such as 4,4'-methylenedianiline; aniline-formaldehyde resin; and trimethylene glycol di-p-aminobenzoate. Mixtures of these exemplified amines may also be used.

Other suitable polyamines for the process according to the present invention include bis-(aminoalkyl)-amines, preferably those having a total of from 4 to 12 carbon atoms, e.g., bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. Hexamethylene diamine, tetramethylene diamine, and especially dodecane diamine are preferably used.

The grafting agent is preferably present in an amount of from about 0.1 to about 30.0 milliequivalents per 100 grams of combined weight of maleated polypropylene and maleated EPR copolymer ("meq/100 g.") as measured by infrared analysis, more preferably 0.1 to 20 meq/100 g., and most preferably 0.1 to 15 meq/100 g.

Thus in one embodiment the process for preparing the graft polymer of this invention comprises the steps of:

(A) combining under polymerization conditions sufficient to form maleated ethylene-alpha-olefin copolymer, ethylene, at least one alpha-olefin monomer, and at least one maleated functional group-containing monomer, in the presence of a non-stereospecific Ziegler-Natta catalyst system selected for its capability for producing random copolymers;

(B) combining a polymer composition prepared in accordance with step (A) and a maleated polypropylene composition and a grafting agent such as a diamine under conditions sufficient to permit grafting of at least a minor portion of the maleated EPR copolymer In broadest terms the process for preparing the graft polymer of this invention comprises combining the maleated EPR copolymer with the maleated polypropylene and the grafting agent under conditions sufficient to permit grafting of at least a minor portion of the EPR copolymer with the polypropylene. Thus the graft copolymer composition of this invention will comprise the reaction product of the above described maleated EPR, the grafting agent and the maleated polypropylene. The reaction is accomplished by contacting the grafting agent and the maleated EPR with the maleated polypropylene whereupon interaction and cross linking take place. Apparently the primary amino groups of the grafting agent form covalent chemical bonds (imide bonds) by reaction with the maleic moieties of the maleated polypropylene and the maleated EPR copolymer, thereby forming covalent linkages between the maleated EPR copolymer and maleated polypropylene.

For best results, a proportion of approximately one-half molar equivalent of grafting agent per molar equivalent of maleic moiety can be employed due to the difunctionality of the grafting agent. The contacting can be accomplished by combining solutions of the polymeric reactants in suitable solvents, such as benzene, toluene, and other inert inorganic solvents, in a suitable reaction vessel under substantially anhydrous conditions. Heating will accelerate the reaction and is generally preferred. However, the reaction is exothermic and will occur at ambient temperatures. More preferably commercially, the contacting can be accomplished by pre-mixing pre-formed pellets of the neat functionalized polymers and adding the grafting agent and melt processing in a physical blender or mixer, such as a Brabender mixer or an extruder, at temperatures of from about ambient to about 350° C., preferably about 75° to about 300° C., and most preferably 150° C. to about 250° C. It is important that essentially all moisture or water be removed by drying prior to contacting the polymer reactants in order to avoid hydrolysis reactions which will compete with the sought cross linking and reduce the yield of the graft copolymer composition of this invention.

Preparation of Extended Grafted Polymers

The polymer gels of the present invention have an extender added to the prepared graft copolymers during final processing. Suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials:

(1) Softening agents, namely aromatic naphthenic and paraffinic softening agents for rubbers or resins;

(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumarone-indene resins, terpene phenol resins, petroleum hydrocarbons and rosin derivative;

(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and (6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular organic materials include latexes, emulsions, liquid crystals, bituminous compositions, and phosphazenes. One or more of these materials may be used as extenders.

In accordance with the present invention, the grafted polymer containing gel composition of the present invention may have added thereto at least about 30, preferably 30 to 1,000, parts by weight of extender per 100 parts by weight of the graft copolymers. Most preferred amounts of added extender include from about 50 to about 500 parts of oil per 100 parts of graft copolymer and ideally about 80 to about 300 parts of extender per 100 parts of graft copolymer.

The polymer gels produced according to the present invention generally have high damping properties having a tan δ in the range of about 0.1 to about 1.0, preferably higher than 0.2 over the temperature range of 30° C. to 100° C., and a Shore A hardness ranging from 0 to about 50, preferably about 1 to about 30, most preferably about 5 to 20 at about 20° C. to 25° C. or at room temperature. The service temperature of the gels of the present invention is less than or equal to 100° C. for most of the polymers of the present invention, e.g., 100° C. compression set of the gel is about 80. Some of the extended polymers of the present invention have a potential use up to 140° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris(nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additive or compounding ingredients per 100 parts of graft copolymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and pprocessability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like.

The gels containing oil or low molecular weight component extended grafted EPR and polypropylene compositions of the present invention may be prepared by any means well known in the art for combining such ingredients, such as solution blending, milling, internal batch mixing, or continuous extrusion of a solid form of the grafted EPR and polypropylene compositions and the other ingredients. A rapid and convenient method of preparation comprises heating a mixture of the components to a temperature of about 50° C. to about 290° C.

The gels containing oil extended grafted EPR and polypropylene compositions of the present invention of this invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or carbon dioxide, is also preferable.

The composition obtained using the manufacturing method of this invention can be molded with equipment conventionally used for molding thermoplastics. It is suitable for extrusion molding, calendar molding, and particularly injection molding.

The composition of the present invention can be mixed in any conventional mixer such as a Banbury mixer or roll mill or extruder normally conducted within the temperature range of about 100° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when forming the molded articles.

The resultant gel composition may be molded in appropriate press ovens and the like to form products in the form of extruded pellets, cut dices, preferably as small as possible since smaller pellets provide short heating times and better flow when utilized in flow molding. Ground pellets may also be utilized.

The extended graft copolymers of the instant invention can be used in high temperature applications including uses in injection molding or in any other compositions typically containing used for elastomeric properties.

In summary, the molded polymers produced from the gels containing extended grafted EPR and polypropylene compositions of the present invention retain elastomeric characteristics and are useful in high temperature applications and/or high damping applications. Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measure of damping is the determination of a parameter called tan $\delta$. A forced oscillation is applied to a material at frequency f and the transmitted force and phase shift are measured. The phase shift angle delta is recorded. The value of tan $\delta$ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan $\delta$ vs. frequency by curve alignment. An alternate method is to measure tan $\delta$ at constant frequency (such as at 10 hz) over a temperature range. We have defined a thermoplastic unfilled material as useful for damping when tan $\delta$>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, household electrical appliances, industrial machinery, precision instruments, transport machinery, constructions, engineering, and medical instruments.

Representative examples the use of damping materials, vibration restraining materials, cushion gel are connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

(1) in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

(2) in information relating equipment, such as in insulators for a hard disk, insulators for motors such as a spindle motor for HHD and stepping motor, insulators for floppy disk drive, insulators for CD-ROM of personal computer, and a holder for optical disk;

(3) in communication equipment, such as in a holder for compact high performance mike or speaker of a portable telephone, a pocket bell or PHS, a mike holder for a wireless equipment, and a disk holder for portable note type electronic equipment;

(4) in home electronics equipment, such as insulators for CD-ROM of home TV game, insulators for cassette holder or CD-ROM of cassette holder or game machine, a holder of high performance mike, and cone edge of speaker; and (5) in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples are presented for purposes of illustration only and are not to be construed in a limiting sense.

Preparation of Graft Copolymers

EXAMPLE 1

A nitrogen purged Brabender mixer (50 g capacity) equipped with a roller blade was initially set to 60 rpm and the temperature was set to 195° C. The mixer was then charged with 10 g of commercial maleated polypropylene and 26 g of commercial maleated EPR. The polymers were agitated in the mixer for 5 minutes. A charge of 0.3 g of ZnO was then added to the mixer. The mixing was continued for another 10 minutes and 0.3 g dodecane diamine was added into the Brabender mixer. At the same time, the heating element was turned off and the polymer was removed from the mixer. A control polymer as Comparative Example 1A was prepared in the same manner, absent the 0.3 g dodecane diamine, but with a charge of 0.6 g of ZnO. A control polymer as Comparative Example 1B was prepared in the same manner, absent both the 0.3 g dodecane diamine and the 0.3 g of ZnO.

EXAMPLE 2

The experiment and the control of Example 1 were repeated with minor changes in the amounts of materials. The mixer was charged with 10 g of commercial maleated polypropylene and 26 g of commercial maleated EPR. The polymers were agitated in the mixer for 5 minutes at 60 rpm. A charge of 0.6 g of dodecane diamine was then added to the mixer. No ZnO was included in this run. The heating element was then turned off and the mixture was then allowed to cool down at a rate of about 4° C./min. The polymer was removed from the mixer after 10 minutes. A control polymer as Comparative Example 2A was prepared in the same manner, absent the 0.6 g dodecane diamine.

EXAMPLE 3

The experiment and the control of Example 1 were repeated with minor changes in operation conditions. At 170° C., the mixer was charged with 10 g of commercial maleated polypropylene and 26 g of commercial maleated EPR. The polymers were agitated in the mixer for 10 minutes. A charge of 0.3 g of ZnO and 0.3 g of dodecane diamine were added to the mixer together and the mixing speed was increased to 90 rpm. The polymer was removed from the mixer after 10 minutes. A control polymer as Comparative Example 3A was prepared in the same manner, absent the 0.3 g of ZnO.

Table 1 displays the compositions prepared in the above examples.

EXAMPLE 4

A nitrogen purged Brabender mixer (300 g capacity) equipped with a roller blade was initially set to 60 rpm and the temperature was set to 195° C. The mixer was then charged with 40 g of commercial maleated polypropylene and 160 g of commercial maleated EPR. The polymers were mixed for 15 minutes and then a charge of 1.6 g of dodecane diamine was added into the Brabender mixer as the speed was increased to 120 rpm. After 15 minutes, the heating element was turned off and the mixing speed was adjusted to 40 rpm. The resulting polymer was removed from the mixer when the temperature dropped to 170° C.

Preparation of Oil Extended Gels

EXAMPLE 5

A charge of 15.6 g of the product from the experiment in Example 1 was added to the Brabender mixer (50 g capacity) equipped with a roller blade. The mixer was initially set to 110° C. and 60 rpm. The polymer was mixed for 10 minutes. The mixer was then set to 175° C. and 35.5 g of aromatic oil was slowly charged into the mixer. After addition of oil is completed, the mixer was further heated to 205° C. for 15 minutes. Subsequently the mixing speed was slowed down to 10 rpm, the heating element was then turned off and the mixture was allowed to cool at a rate of about 4° C./min. to 170° C. The agitation was turned off and the mixture was removed from the mixer. The resultant properties of the extended graft polymer are shown in Table 2. The control polymers of Comparative Examples 1A and 1 B were extended in the same manner shown in Table 2 as Examples 4A and 4B.

EXAMPLE 6

A charge of 15.1 g of the product from the experiment in Example 2 was added to the Brabender mixer at 165° C. and 60 rpm. The graft polymer was melted immediately. After 2 minutes, 35.5 g of aromatic oil was slowly charged into the mixer. After the addition of oil was completed, the mixer was further heated to 205° C. for 20 minutes. The heating element was then turned off and the mixture was allowed to cool down at a rate of about 4° C. down to 170° C. The agitation was turned off and the mixture was removed from the mixer. The control polymer of Comparative Example 2A was extended in the same manner and is shown in Table 2 as Example 6A.

EXAMPLE 7

The products from the experiment and the control of Example 3 were oil-extended according to the procedure of Example 5 and the physical properties of the oil extended gels are shown in Table 2.

EXAMPLE 8

A charge of 78 g of the product prepared in Example 4 was added to the 300 g capacity Brabender mixer at 25° C.

and 20 rpm. After 2 minutes, 182 g of aromatic oil was slowly charged into the mixer. After the addition of oil was completed, the mixer was further heated to 205° C. and agitated at 80 rpm for 120 minutes. The heating element was then turned off and the mixture was allowed to cool down. The agitation was turned off and the mixture in the form of a homogenous gel was removed from the mixer having properties shown in Table 2.

The products of all of the oil-extended polymers shown in Examples 5 to 8 and analagous controls were molded into sheets and cylinder button at 190° C. Ring samples were cut from these sheets for tensile measurement. The physical properties of the oil extended gels are listed below in Table 2.

TABLE 1

| Example No. | 1 | 1A | 1B | 2 | 2A | 3 | 3A | 4 |
|---|---|---|---|---|---|---|---|---|
| ma-EPR*/ma-PP** | 70/30 | 70/30 | 70/30 | 70/30 | 70/30 | 70/30 | 70/30 | 70/30 |
| Coupling Agent $(NH_2)_2C_{12}$ | 1% | 0% | 0% | 2% | 0% | 1% | 1% | 0.7% |
| Modifier ZnO | 1% | 6% | 0% | 0% | 0% | 1% | 0% | 0% |

*Exxelor ™ VA1803 from Exxon Chemical-maleated EPR containing 0.75% maleic anhydride.
**Exxelor ™ P01015 from Exxon Chemical-maleated polypropylene containing 0.4% maleic anhydride.

Although the invention has been described with reference to particular means, materials and embodiments it is to be understood that the invention is not limited to the particulars disclosed and extends to all equivalents within the scope of the claims.

What is claimed is:

1. An extended polymer composition comprising: 100 parts by weight of a graft copolymer composition comprising a maleate functionalized ethylene-alpha-olefin copolymer having a maleate functionalized polypropylene grafted thereto through one or more functional linkages formed from the reaction of an organic diamine grafting agent with the maleate functional groups on the ethylene-alpha-olefin copolymer with the maleate functional groups on the polypropylene; and at least 30 parts by weight of an extender comprising an extender oil or an organic material having a number-average molecular weight of less than 20,000, said composition having a Shore A hardness ranging from at least 0 to about 15 at about 20° C. to 25° C. and having a tan δ in the range of about 0.22 to about 1.0 over the temperature range of 25° C. to 100° C.

2. The composition of claim 1 wherein said ethylene-alpha-olefin copolymer has a degree of crystallinity less than 25% and a weight average molecular weight between about 5,000 and 1,000,000.

3. The composition according to claim 1 wherein said maleate functionalized ethylene-alpha-olefin copolymer comprises from about 0.02 to about 5 percent by weight of maleic anhydride.

TABLE 2

| Example No. | 5 | 5A | 5B | 6 | 6A | 7 | 7A | 8 |
|---|---|---|---|---|---|---|---|---|
| Polymer used | Ex. 1 | Ex. 1A | Ex. 1B | Ex. 2 | Ex. 2A | Ex. 3 | Ex.3A | Ex. 4 |
| Aromatic Oil Content[1] | 70% | 70% | 70% | 70% | 70% | 70% | 70% | 70% |
| Modifier ZnO | 1% | 6% | 0% | 0% | 0% | 1% | 0% | 0% |
| Properties of Gels | | | | | | | | |
| Compression Set[2] (100° C.) | 67 | 107 | flow | 78 | flow | 80 | 76 | 61 |
| Shore A (25° C.) Hardness | 14 | 8 | — | 15 | — | 14 | 15 | 12 |
| Ring Tensile (psi) (25° C.) | 83.4 | — | flow | 49.2 | flow | 38.4 | 43.7 | 45.7 |
| Maximum Strain (%) | 260 | — | — | 136 | — | 114 | 103 | 216 |
| Tanδ (3 Hz) | | | | | | | | |
| @ 25° C. | 0.27 | — | — | 0.28 | — | — | — | — |
| @ 135° C. | 0.42 | | | 0.50 | | | | |
| Tanδ (10 Hz) | | | | | | | | |
| @ 25° C. | 0.22 | — | — | 0.25 | — | — | 0.25 | 0.23 |
| @ 100° C. | 0.32 | | | 0.38 | | | 0.39 | 0.23 |
| $G'_{25° C.}/G'_{100° C.}$ DMS ratio[3] | 3.0 | — | — | 3.2 | — | — | 2.3 | 3.5 |

[1]Sundex 790 from Sun Oil Company-Aromatic Oil
[2]The Compression Set was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 100° C. (or at 150° C. in subsequent examples) for 22 hours. The sample is removed from the oven, the stress on the sample is relieved, the sample is stored at room temperature for 30 minutes and the recovery of the sample is measured as the final sample height as X in: Compression Set = ((0.5 − X)/(0.5−0.375)) × 100%.
[3]Dynamic Shear Modulus ratio measured at 25° C. and at 100° C.

4. The composition according to claim 1 wherein said maleate functionalized polypropylene comprises from about 0.02 to about 5 percent by weight of maleic anhydride.

5. The composition according to claim 1 wherein said polypropylene has a weight average molecular weight between about 10,000 to about 10,000,000.

6. The composition according to claim 1 wherein said polypropylene has a weight average molecular weight between about 20,000 to about 300,000.

7. The extended polymer composition of claim 1 further comprising from 1 to 350 parts of a inorganic filler, additive or compounding ingredient based on 100 parts by weight of the graft copolymer composition.

8. The extended polymer composition of claim 1 wherein the extender is present in an amount between about 30 to about 1000 parts by weight per 100 parts by weight of the graft copolymer composition.

9. The extended polymer composition of claim 1 wherein the extender is at least one compound selected from the group consisting of: softening agents, plasticizers, tackifiers, oligomers, lubricants, petroleum hydrocarbons, silicone oil, aromatic oil, naphthenic oil and paraffinic oil.

10. The extended polymer composition of claim 1 wherein the composition is in the form of a gel.

11. The extended polymer composition of claim 1 wherein the organic diamine grafting agent is selected from the group consisting of: bis-(aminoalkyl)-amines, having a total of from 4 to 12 carbon atoms and diamines represented by the general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms or an aromatic hydrocarbon group having from 6 to 20 carbon atoms or $R_1$ represents an N-heterocyclic ring having from 4 to 20 carbon atoms.

12. The extended polymer composition of claim 1 wherein the organic diamine grafting agent is selected from the group consisting of: ethylene diamine; 1,2- and 1,3-propylene diamine; 1,4-diaminobutane; 2,2-dimethylpropane diamine-(1,3); 1,6-diaminohexane; 2,5-dimethylhexane diamine-(2,5); 2,2,4-trimethylhexane diamine-(1,6); 1,8-diaminooctane; 1,10-diaminodecane; 1,11-undecane diamine; 1,12-dodecane diamine; 1-methyl-4-(aminoisopropyl)-cyclohexylamine- 1; 3-aminomethyl-3,5,5-trimethyl-cyclohexylamine-(1); 1,2-bis-(aminomethyl)-cyclobutane; p-xylylene diamine; 1,2- and 1,4-diaminocyclohexane; 1,2-; 1,4-; 1,5- and 1,8-diaminodecalin; 1-methyl-4-aminoisopropyl-cyclohexylamine-1; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, dianisidine; 2,4-toluenediamine, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminiophenyl) sulfone; diaminiodiphenylsulfone; 4-chloro-o-phenylenediamine; m-aminobenzylamine; m-phenylenediamine; 4,4'-$C_1$–$C_6$-dianiline; aniline-formaldehyde resin; trimethylene glycol di-p-aminobenzoate; bis-(2-aminoethyl)-amine; bis-(3-aminopropyl)-amine; bis-(4-aminobutyl)-amine; bis-(6-aminohexyl)-amine; isomeric mixtures of dipropylene triamine and dibutylene triamine; hexamethylene diamine; tetramethylene diamine; and dodecane diamine and mixtures thereof.

13. A flexible, molded thermoplastic elastomer article comprising: 100 parts by weight of a graft copolymer composition comprising a maleate functionalized ethylene-alpha-olefin copolymer having a maleate functionalized polypropylene grafted thereto through one or more functional linkages formed from the reaction of an organic diamine grafting agent with the maleate functional groups on the ethylene-alpha-olefin copolymer with the maleate functional groups on the polypropylene; and at least 30 parts by weight of an extender comprising extender oil or an organic material having a number-average molecular weight of less than 20,000, said composition having a Shore A hardness ranging from at least 0 to about 15 at about 20° C. to 25° C. and having a tan δ in the range of about 0.22 to about 1.0 over the temperature range of 25° C. to 100° C.

14. The flexible, molded thermoplastic elastomer article of claim 13 further comprising from 1 to 350 parts of a inorganic filler, additive or compounding ingredient based on 100 parts by weight of the graft copolymer composition component.

15. The flexible, molded thermoplastic elastomer article of claim 13 wherein the extender is at least one compound selected from the group consisting of: softening agents, plasticizers, tackifiers, oligomers, lubricants, petroleum hydrocarbons, silicone oil, aromatic oil, naphthenic oil and paraffinic oil.

16. The flexible, molded thermoplastic elastomer article of claim 13 wherein the organic diamine grafting agent is selected from the group consisting of: bis-(aminoalkyl)-amines, having a total of from 4 to 12 carbon atoms and diamines represented by the general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms or an aromatic hydrocarbon group having from 6 to 20 carbon atoms or $R_1$ represents an N-heterocyclic ring having from 4 to 20 carbon atoms.

17. The flexible, molded thermoplastic elastomer article of claim 13 wherein the organic diamine grafting agent is selected from the group consisting of: ethylene diamine; 1,2- and 1,3-propylene diamine; 1,4-diaminobutane; 2,2-dimethylpropane diamine-(1,3); 1,6-diaminohexane; 2,5-dimethylhexane diamine-(2,5); 2,2,4-trimethylhexane diamine-(1,6); 1,8-diaminooctane; 1,10-diaminodecane; 1,11-undecane diamine; 1,12-dodecane diamine; 1-methyl-4-(aminoisopropyl)-cyclohexylamine-1; 3-aminomethyl-3,5,5-trimethyl-cyclohexylamine-(1); 1,2-bis-(aminomethyl)-cyclobutane; p-xylylene diamine; 1,2- and 1,4-diaminocyclohexane; 1,2-; 1,4-; 1,5- and 1,8-diaminodecalin; 1-methyl-4-aminoisopropyl-cyclohexylamine-1; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, dianisidine; 2,4-toluenediamine, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminiophenyl) sulfone; diaminiodiphenylsulfone; 4-chloro-o-phenylenediamine; m-aminobenzylamine; m-phenylenediamine; 4,4'-$C_1$–$C_6$-dianiline; aniline-formaldehyde resin; trimethylene glycol di-p-aminobenzoate; bis-(2-aminoethyl)-amine; bis-(3-aminopropyl)-amine; bis-(4-aminobutyl)-amine; bis-(6- aminohexyl)-amine; isomeric mixtures of dipropylene triamine and dibutylene triamine; hexamethylene diamine; tetramethylene diamine; and dodecane diamine and mixtures thereof.

18. The flexible, molded thermoplastic elastomer article of claim 13 wherein said maleate functionalized ethylene-alpha-olefin copolymer comprises from about 0.02 to about 5 percent by weight of maleic anhydride.

19. The flexible, molded thermoplastic elastomer article of claim 13 wherein said maleate functionalized polypropylene comprises from about 0.02 to about 5 percent by weight of maleic anhydride.

* * * * *